LIFTING DEVICE, PARTICULARLY VEHICLE JACK

Original Filed Feb. 17, 1967 3 Sheets-Sheet 1

INVENTOR.
WILLIAM W. WEISS
BY Robert D. Lyman
ATTORNEY

LIFTING DEVICE, PARTICULARLY VEHICLE JACK

Original Filed Feb. 17, 1967 3 Sheets-Sheet 2

LIFTING DEVICE, PARTICULARLY VEHICLE JACK
Original Filed Feb. 17, 1967 3 Sheets-Sheet 3
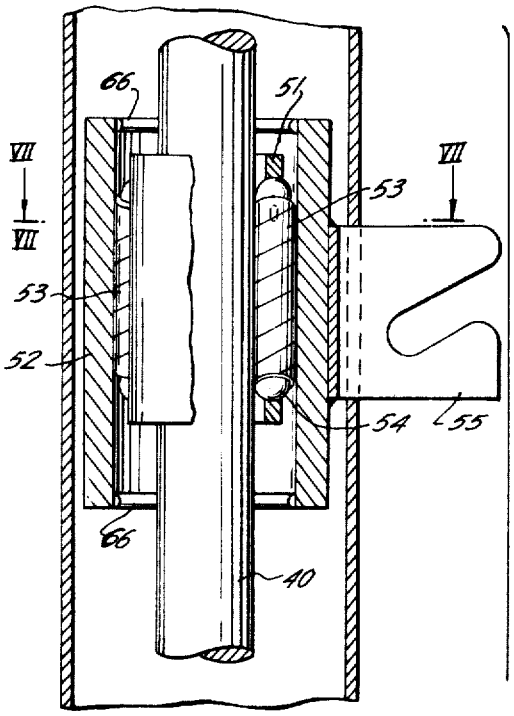
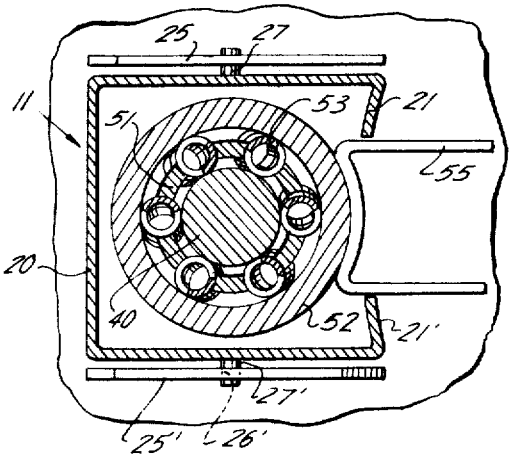
FIG. 7
FIG. 6
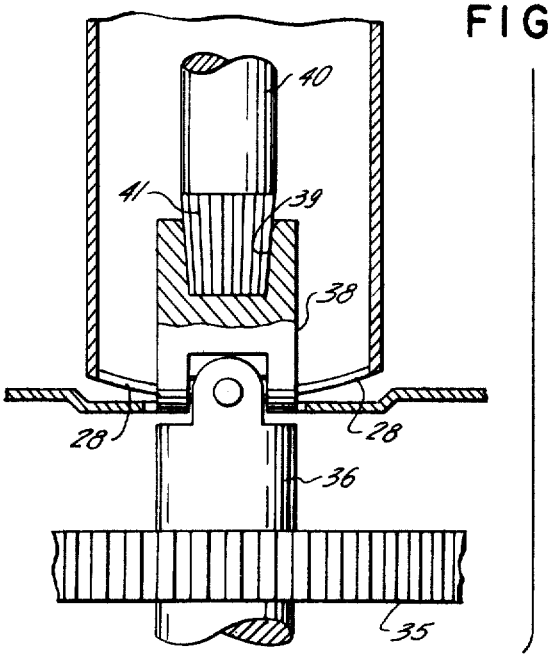

United States Patent Office

Re. 26,846
Reissued Apr. 7, 1970

26,846
LIFTING DEVICE, PARTICULARLY VEHICLE JACK

William W. Weiss, Norwalk, Conn., assignor to Superior Electric Motor Sales, Inc., Broadway, N.Y.

Original No. 3,376,019, dated Apr. 2, 1968, Ser. No. 616,830, Feb. 17, 1967. Application for reissue June 18, 1968, Ser. No. 741,835
Int. Cl. B66f *3/44*
U.S. Cl. 254—1 14 Claims

Matter enclosed in heavy brackets [ ] appears in the original patent but forms no part of this reissue specification; matter printed in italics indicates the additions made by reissue.

ABSTRACT OF THE DISCLOSURE

A unilateral rotary motion-longitudinal motion translator is mounted on a smooth spindle set on a base; it includes a pair of sleeves, the inner one carrying springs inclined with respect to the spindle; the outer one a car lift attachment. A motor, preferably one which can be plugged into a vehicle cigarette lighter, drives the spindle which will make the car lift attachment travel up the spindle; when the motor is stopped, the [springs will bind and hold a] car *is held* jacked in raised position without further brakes. The ends of the spindle are relieved to prevent over-running of the motion or translator.

The present invention relates to a motor-powered lifting device, and more particularly to electrically powered jacks for automotive vehicles, such as jacks for passenger cars, trucks, farm tractors and the like.

Lifting devices, and particularly car jacks, are usually hand-operated. In one form, screw threads and nuts are used. These usually have a substantial amount of friction. The frictional losses can be substantially decreased if, instead of screw thread-nut engagements, ball-engaged threads, or other ball-engaged lifting devices are used. The designer of automotive jacks of this kind is, however, faced with the problem that when friction is reduced between the screw spindle and the engaging nut, the weight of the car, that is its static energy, as it is being lifted, will likewise act in the reverse, that is from the car through the nut and thus the car may slide down inadvertently unless brakes or stops are employed. Such brakes prevent relative rotation of the parts, that is of the nut or of the spindle after the vehicle has been lifted. These brakes or stops must be safe in use; they require additional manufacturing steps, additional parts, and increase cost and complexity of the jack.

Motor-driven car jacks, that is jacks which are either hydraulically, pneumatically, or electrically operated, require a motor which is strong enough to lift a vehicle, or at least to lift part thereof if a bumper jack arrangement is used; in addition, it must overcome the frictional forces inherent in the jack. If these frictional forces are decreased, the size of the motor can be decreased; however, as noted above, special braking arrangements will then be necessary in connection with the motor, or jack apparatus, to prevent the vehicle from acting on the lifting device and descend against the frictional and holding forces of the disconnected motor.

It is an object of the present invention to provide a motor-powered lifting device, and particularly a vehicle jack, which is inexpensive to manufacture and can be powered by a small motor, for example by an electric motor which can be operated from the cigarette lighter of the vehicle and which holds the lifted article, for example the vehicle, securely and safely in a jacked-up position.

The solution to the problem is found in the design of a jack which incorporates a device which will be termed hereinafter as a unilateral rotary motion-longitudinal motion translator. Such a device is capable of travelling lengthwise of a spindle, when relative rotation between the device and the spindle occurs. The direction of rotation determines the direction of longitudinal travel. Power will be transferred by relative rotation, that is by rotation of parts within the device or of the spindle to cause the longitudinal travel, for example against the weight of the vehicle. When this rotation stops, however, the spindle will support the lifted weight but no power will be transferred from the unilateral rotary motion-longitudinal motion translator to the spindle, so that the vehicle will remain jacked-up; that is, the transfer of power is unilateral. In other words, the translation of power from rotary motion to longitudinal motion is not reversible, but is in one direction only. It should be noted that the direction of travel is reversible; the translation of power is not.

SUBJECT MATTER OF THE INVENTION

Briefly, the lifting device of the present invention is formed with a usual base and a lift support mounted on a base to transfer thrust placed on the support to the base. A smooth spindle is provided, and a unilateral rotary motion-longitudinal motion translator is mounted on the spindle to engage the spindle so that the motion translator can travel lengthwise of the spindle. A motor, which is preferably an electric motor powered, for example, by a vehicle to be lifted, imparts relative rotation to the spindle and the unilateral rotary motion-longitudinal motion translator. A load attachment, such as a bumper jack attachment is connected to the unilateral rotary motion-longitudinal motion translator. Upon relative rotation, in either direction, of the spindle with respect to the motion translator, the motion translator will travel up and down on the spindle. Upon termination of relative rotation, it will retain its position on the spindle regardless of the load placed on the load-attachment means—within the designed capacity of the lifting device.

The unilateral rotary motion-longitudinal motion translator itself can be formed of a pair of concentric sleeves surrounding the spindle, one of the sleeves being constrained against rotation. A plurality of helical springs is carried by the inner one of the sleeves, which springs have their major axes inclined with respect to the axis of the spindle. The springs are arranged to be in contact with the surface of the spindle as well as the inner surface of the outer one of the concentric sleeves, so that the inner sleeve forms a cage for the springs. *Friction is inherent in any motion transfer mechanism. By choice of the angle of inclination of the springs to the motion translator, the motion translator when connected by the usual gearing to the motor, transmits power unilaterally.*

In one embodiment of the present invention, the motor is mounted in the base and drives the spindle, and the outer one of the sleeves is constrained against rotation, for example by sliding in a guideway or track, and further by engagement with the article to be lifted, for example, the bumper of a vehicle; in another form of the invention, the motor drives one of the sleeves, and the spindle is constrained against rotation. In this latter form of the invention, the motor itself travels up and down with the motion translator.

According to a feature of the invention, the spindle has a region of lesser diameter near its upper and lower ends, so that when the unilateral rotary motion-longitudinal motion translator reaches the regions of lesser diameter, engagement with the spindle will be lost, and no further motion will be transferred. Thus over-running of the ends of the spindle is prevented without the use of additional limit switches.

The specific construction of the unilateral longitudinal motion-rotary motion translator can be similar to the mechanism disclosed in FIGS. 1–4 in U.S. Patent 3,081,-639, Hauptman, entitled "Freed Mechanism." It has been found that the structure illustrated and described in connection with FIGS. 1–4 of the Hauptman Patent 3,081,-639 does have the characteristic of unilateral power transfer *when the angle of the inclined elements is properly chosen.* [The structures indicated in the other figures] *Structures other than those* of the aforesaid patent do not have this unilateral power transfer characteristic; this is an important feature of the present invention because the cost of the jack assembly can be materially reduced if no separate mechanism is needed to provide a holding force, or a brake for a load as great as that of a vehicle.

The structure, organization and operation of the invention will now be described more specifically in the following detailed description with reference to the accompanying drawings, in which:

FIG. 6 is a longitudinal sectional view, at an enlarged scale, of the spindle and the unilateral motion translator; and FIG. 7 is a transverse sectional view taken along line VII—VII of FIG. 6.

Figure 1:
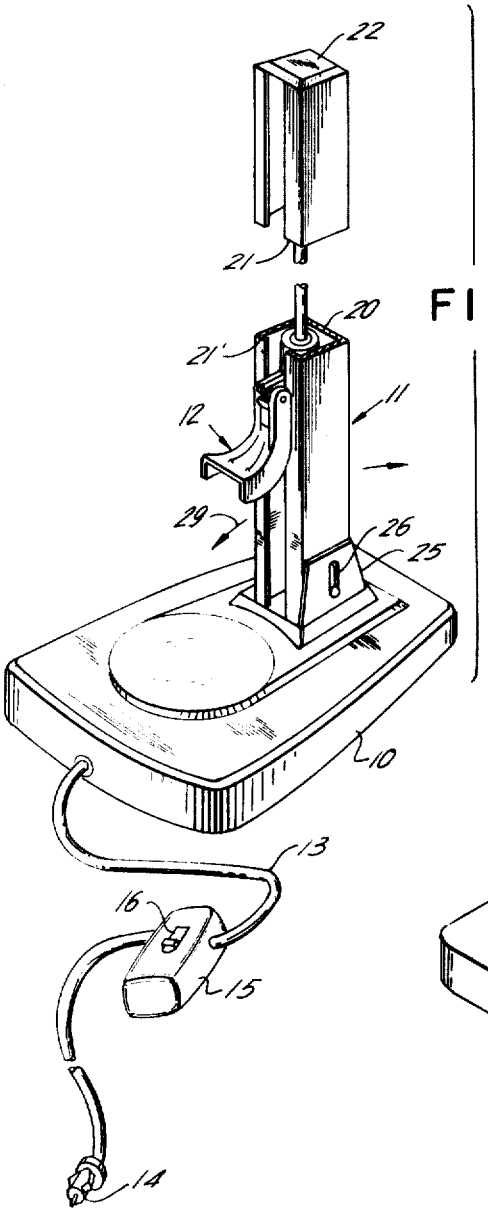
FIG. 1 is a perspective view of a lifting device formed as a car jack in accordance with the present invention.

Referring now to the drawings, and in particular to FIGURE 1: the lifting device, formed as a car jack, comprises a base 10 and an upright, weight-supporting column 11 attached thereto. To lift a vehicle, a bumper-holding bracket 12 is provided, which can travel longitudinally of column 11. Jack 10 is powered by an electric motor, connected by means of a cord 13, having an attachment plug 14 which fits the standard cigarette lighter outlet in a vehicle. A light, unit 15, which carries an on-off switch for the motor 16 is connected into cord 13.

Column 11 consists of an outer protective longitudinal channel member 20 (see also FIGURE 7), having an open side, formed with a pair of in-turn flanges 21, 21'. The channel 20 is closed off at the top by means of a cap 22. Channel 20 is held on the base 10 by a pair of parallel flanges 25, 25', for example welded to the base, each of which are formed with an elongated slot 26, 26', respectively, into which a pin 27, 27' secured to channel 20 fits. The elongated slots 26, 26' are long enough so that the entire column 11 can be lifted and folded over flat for storage, as best seen in FIG. 4. The column 11, in FIGURE 4 itself, is shown somewhat exaggerated for better illustration; the sides of the channel 20, at their lower end, are preferably somewhat rounded, as best seen at 28 (FIG. 4) to permit rocking of the entire column 11 in the direction of arrow 29 (FIGURE 1, FIGURE 3) after a vehicle bumper 30 (FIGURE 3) is placed on the bumper bracket 12, and then rides up on the column 11.

Figure 3:
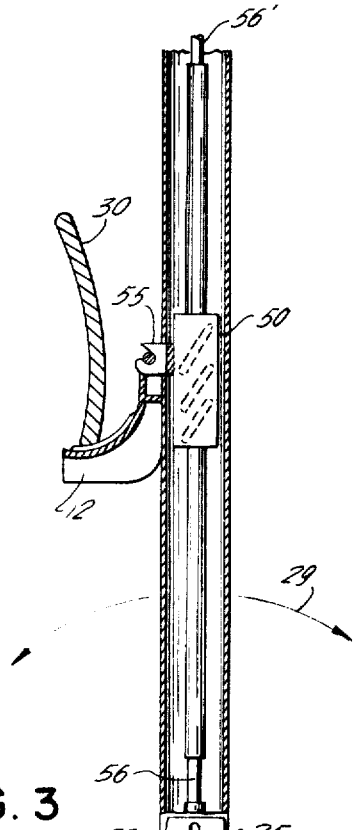
FIG. 3 is a schematic, longitudinal partly sectional view of the embodiment of FIG. 1.
Figure 4:
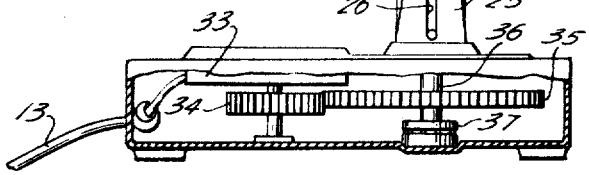
FIG. 4 is a partial sectional view similar to FIG. 3 of the jack in folded position.
Figure 4:
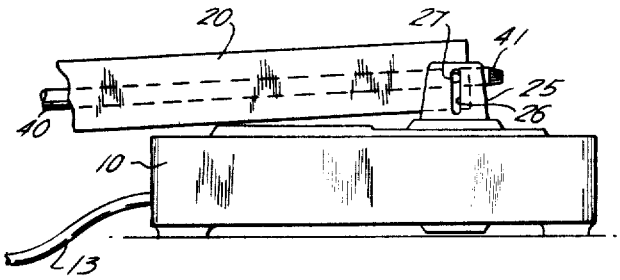

FIGURE 3 illustrates the internal arrangement of the bumper jack of FIGURE 1. The electric cord 13 connects to a motor 33, which may be a permanent magnet-printed circuit motor. Such motors have a high speed, in the order of 5,000 r.p.m. The friction of the unilateral rotary motion-longitudinal motion translator is so low that a motor having 125 to 130 watts consumption upon starting, and less upon running, can lift a vehicle such as an ordinary passenger car, farm tractor, or light truck, *but high enough to prevent the weight of the vehicle from forcing the motion translator down on the spindle.* This permits connecting the motor to the ordinary cigarette lighter of a vehicle, which is usually fused for 15 amperes and 12 volts, thus providing a maximum safe-loading of 180 watts. The motor which can be used in the car jack of the present invention is thus entirely within the electrical rating of the ordinary accessory equipment fusing of vehicles. The direction of rotation of the motor is determined by the switch setting of switch 16, combined with light unit 15. This switch may be of the up, center-off, down position type. The use of a permanent magnet motor readily provides for reversal of direction of rotation of the motor. Printed circuit permanent motors are inexpensive and readily obtainable, made by mass production processes, and provide for efficient utilization of electrical input as well as for reversibility of direction of rotation. The light unit itself may further be provided with a magnet attached to the housing, to be placed against the jack for storage.

Gear 35 is connected to a stub shaft 36 (FIGURE 3, FIGURE 6) journalled in the base 10 by means of a thrust bearing 37. The upper end of stub shaft 36 is connected to a universal joint 38 (FIGURE 6). The upper end of universal joint 38 is formed of an inwardly tapering, splined socket 39.

Spindle 40, having a splined tapered end 41 which fits into and matches socket 39 extends vertically within column 11. It is held at its upper end, loosely and rotatably, in cap 22. It can be seen that upon lifting of channel 20, the entire column consisting of channel 20 and the spindle can be disengaged from the base, tapered spindle end 41 releasing from socket 39; the universal joint 38 transmits rotation from gear 35 and stub shaft 36 to spindle 40, regardless of tilting of column 11 in the direction of arrows 29 (FIGURE 1, FIGURE 3).

Figure 5:
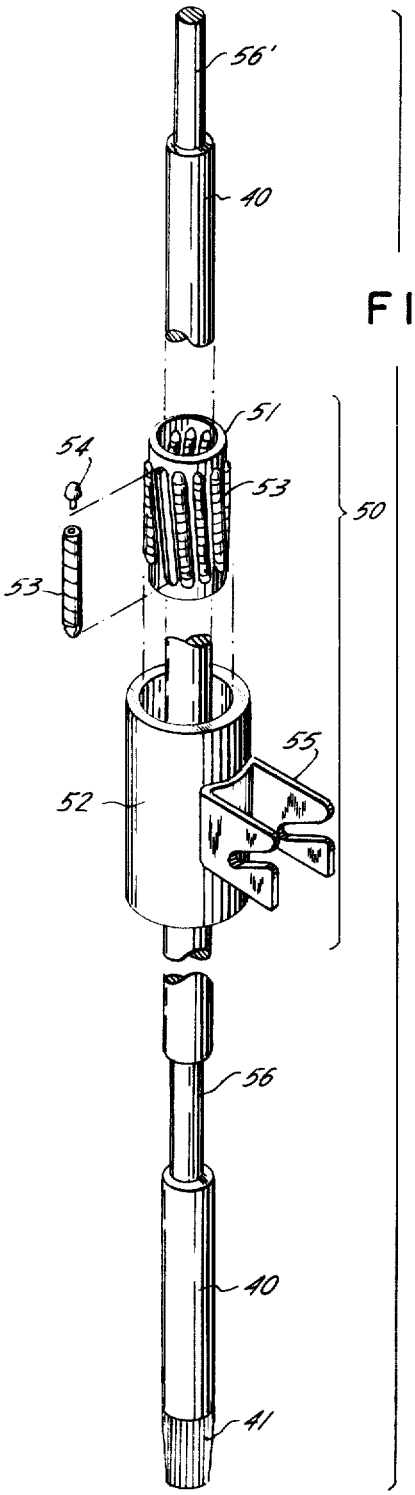
FIG. 5 is an exploded isometric view of the spindle and the unilateral longitudinal motion-rotary motion translator.

Longitudinal motion is imparted to the bumper bracket 12 by means of the unilateral rotary motion-longitudinal motion translator best seen in the exploded view of FIGURE 5, and in the sectional views of FIGURES 6 and 7. The unilateral motion translator, generally indicated at 50 consists of a pair of concentric sleeves 51, 52, of which the inner one, that is sleeve 51, is formed with longitudinal slots, inclined with respect to the axis of the sleeve and thus of spindle 40, to form a cage. Retained in the slots are helical springs 53, which project both beyond the inside and the outside of sleeve 51. At the inside, the springs 53 engage the outer surface of spindle 40. At the outside, they engage the inner surface of outer sleeve 52. The springs 53 may merely be placed into the slot, or may be provided with end pieces 54, one of which is shown in detail in FIGURE 5, which are merely hemispherical units with a small projection to fit within the helical springs. These end pieces 54 are not necessary for the functioning of the invention, however. The outer sleeve 52 has an attachment bracket 55 integral therewith, or secured thereto, for example by welding, to which the bumper bracket 12 (FIG. 1) may be secured. Bracket 55 is just slightly narrower than the width between the gap formed by the in-turn flanges 21, 21' of channel 20, so that the bracket 55 can slide longitudinally within the gap formed between the in-turn flanges 21, 21' and constrain sleeve 52 against rotation with respect to the spindle 40 (see FIGURE 7).

If a weight, such as the bumper 30 of a vehicle, is placed on bumper bracket 12, and the motor 33 is energized, rotation will be transmitted over gears 34, 35, stub shaft 36, universal joints 38, and socket 39 to splined end 41 of spindle 40. The inclination of the springs 53 with respect to the axis of the spindle will cause the unilateral rotary motion-longitudinal motion translator 50 to move longitudinally of the spindle 40, and bracket 55, within the gap formed by in-turn flanges 21, 21', as fully explained in the aforementioned patent to Hauptman, 3,081,639. The direction of motion is determined by the direction of rotation of spindle 40, and by the direction of inclination of the springs 53 with respect to the axis of spindle 40, which latter direction is determined during construction and is non-reversible, whereas the direction of rotation of motor 33 is reversible. The cage 51 is not constrained against rotation; a small shoulder or in-turn edge 66 is provided on outer sleeve 52 to prevent escape of cage 51 from the outer sleeve.

When motor 33 is disconnected, power cannot be transmitted from the bumper bracket 12 and attachment bracket 55 to the spindle. The action is not entirely understood, but it appears that the springs 53 will compress and bind, effectively preventing relative rotation of the cage and spindle 40 with respect to outer sleeve 52, the rotation of which is constrained by the fit of bracket 55 between inturn flanges 21, 21' of channel 20. It has been found experimentally that a spindle having an outer diameter of about ½ inch, and which may be solid or tubular, can readily support an ordinary passenger car or light truck without bending, safely and securely, and without shift of weight of the vehicle as soon as the motor is stopped. Still, a motor drawing as little power as 125 watts on starting, and approximately 80 watts on running, is capable of lifting such a vehicle.

As has been pointed out, it is important that relative rotation must be imparted between either one of the sleeves 51, 52 and spindle 40. It is thus possible to construct a device shown generally in FIGURE 2, in which the motor is combined with the unilateral rotary motion-longitudinal motion translator. In such a structure, the spindle is constrained against rotation.

Base 60 has a spindle 61 mounted thereon, constrained against rotation with respect to the base, for example, by means of a cross-pin extending through a collar 62.

Figure 2:
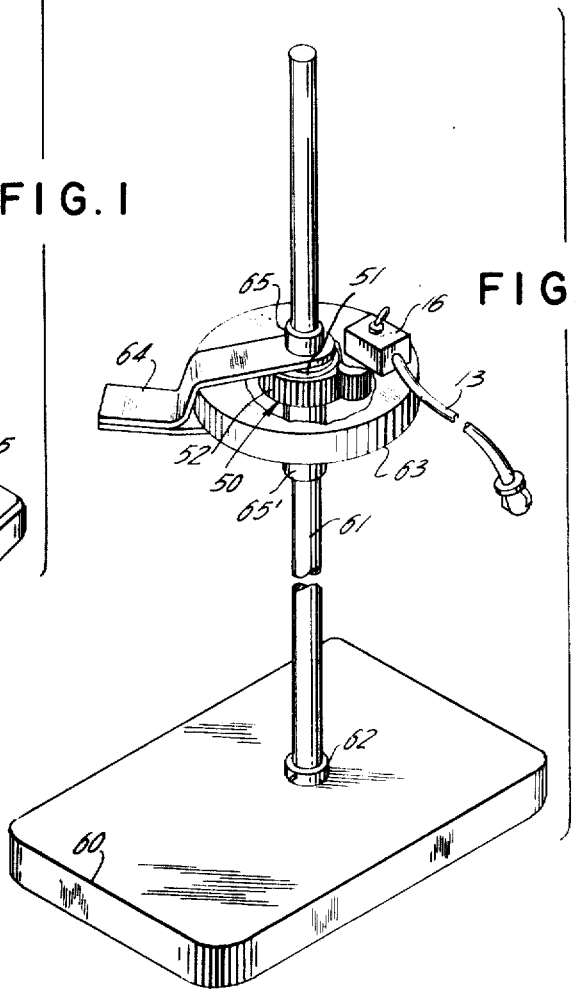
FIG. 2 is a perspective view of another embodiment of the car jack.

A motor which may be incorporated in a housing 63, and again connected by cord 13 and over switch 16, is arranged internally of the housing to drive the outer sleeve of the unilateral rotary motion-longitudinally motion translator, all assembled within housing 63. The motor, in this case, may again be a printed circuit motor having a group of permanent magnets arranged within housing 63, along the circumference thereof, with a large-diameter, short-length armature which is in driving engagement with the outer sleeve of the motion translator. Other constructions, such as a separate motor mounted for example beneath switch 16 and having a pinion and gear driving arrangement similar to that shown in the base 10 of FIGURE 3 can readily be visualized. Since the outer housing 63, itself, will not turn, it may have a bumper bracket 64, directly attached thereto. Collars 65, 65' slide on spindle 61 and keep out dirt and contamination from the unilateral longitudinal motion-rotary motion translator within housing 63. In the construction of FIGURE 2, the connecting cord 13 travels with the lifting unit; this may be a disadvantage if the entire jack is subject to careless handling and for general use the form shown in FIGURE 1 and described in detail with reference to FIGURES 3–7 is preferred. The restraint against rotation of the housing 63, with respect to spindle 61, may be determined either by a groove or spline formed in spindle 61 or may be obtained directly by friction of attachment bracket 64 against the load being lifted, for example the bumper of a vehicle.

If the operator should be careless and permit the unilateral rotary motion-longitudinal motion translator to run too far to the end of the spindle, damage to the jack or overtravel at the upper end may result. This can be prevented easily, and without the use of limit switches, by providing a relief 56, 56' (shown exaggerated in FIGURES 3 and 5). When the springs 53 retained in cage 51 reach the region 56, 56', engagement of the springs 53 with the surface of the spindle will be lost, and thus, no rotary motion will be transmitted to the cage, and thus no further longitudinal motion will result. Since the loss of contact of springs 53 with the outer surface of spindle 40 will be gradual, through the longitudinal extent of springs 53, any weight or restraint against the translator 50 will merely cause slippage; reversal of rotation of the spindle 40 will then again cause positive drive and engagement of unit 50 with the normal-circumference portion of spindle 40. The spindle 61 of FIGURE 2 may likewise, adjacent its upper and lower end portions, have a relief section.

The attachment bracket 55 (FIGURES 3, 5) or 64 (FIGURE 2) may take various forms; a longitudinal strip, having a cross-section similar to that of bracket 55 and having staggered slots to attach the bumper bracket 12, may be used to accommodate, in one bumper jack, vehicles of widely varying heights; likewise, an intermediate link, formed for example of chain links may be used to interconnect attachment bracket 55 and bumper bracket 12. The structural members, that is the base, channel 20, brackets 25 and the like (FIGURE 1), may all be stampings or extrusions. The diameter of spindle 40 may vary gradually, and not abruptly as shown in the transition to reliefs 56, 56' (FIGURE 5); further, towards the upper end and below relief 56', the spindle 40 may thicken slightly to provide for tighter engagement of the springs 53.

The present invention thus provides a motor driven jack, and particularly a jack which can be driven by a very small high-speed, low-power motor suitable for connection to the cigarette lighter of a vehicle, which is inexpensive to construct and which does not need a special brake or holding arrangement, because of the presence of an element having the unique property of unilaterally transmitting power from rotary motion to longitudinal motion, but not in the reverse.

The lifting device in accordance with the present invention has been illustrated and described in detail with reference to an automotive jack, powered by an electrical motor. The motor may take any form, for example be a pneumatic, vacuum, or hydraulic motor, and the particular power input is left to the choice of the user and for the particular application. The lifting device itself may be used in many other applications, for example, to raise and lower dentists' chairs, barber chairs, operating tables or the like; or may be incorporated with furniture or other machinery lifters, such as the lifting mechanism in fork-lift trucks. The lifting device utilizing the unilateral rotary motion-longitudinal motion translator is particularly applicable where a source of electrical power is readily available, where small size and great lifting power, coupled with low price is of importance, and where the distance the load has to be lifted is not very great, such as about one or two feet.

I claim:

1. In a motor-powered lifting device having a base (10, 60), a motor (33) and load attachment means (12, 55, 64), the improvement comprising:

a smooth spindle (40, 61) and a unilateral rotary motion-longitudinal motion translator (50) mounted on and engaging said spindle (40, 61) for movement lengthwise thereof;

said motor (33) imparting relative rotation to said spindle (40, 61) and said translator (50);

said translator including means for gripping said spindle upon cessation of said relative rotation of said spindle and translator;

said load attachment means being secured to said unilateral rotary motion-longitudinal motion translator (50) whereby, upon relative rotation in either direction, the unilateral rotary motion-longitudinal motion translator (50) will travel up or down on said spindle (40, 61) and, upon termination of relative rotation, will retain its position on the spindle.

2. Lifting device as claimed in claim 1, wherein said unilateral rotary motion-longitudinal motion translator (50) includes a pair of concentric sleeves (51, 52) surrounding said spindle (40), one of said sleeves (52) being constrained (21, 21', 55) against rotation; and a plurality of helical springs (53) carried by the inner one of said sleeves (51) having major axes inclined with respect to the axis of the spindle (40), said springs (53) being in contact with the surface of said spindle (40) and with the inner surface of the outer one of said concentric sleeves (52).

3. Lifting device as claimed in claim 2, wherein said attachment means (55) is secured to the outer one (52) of said sleeves.

4. Lifting device as claimed in claim 2, wherein said motor (33) is mounted in the base (10) and is in driving engagement (34, 35, 38) with said spindle (40), and said outer sleeve (52) is constrained against rotation.

5. Lifting device as claimed in claim 4, forming a jack for automotive vehicles and adapted for lifting one end of the vehicle, said jack including a thrust bearing (37) in said base (10), a stub shaft (36) mounted on said thrust bearing, and a universal joint (38) interconnecting said spindle (40) and said stub shaft (36) to permit tilting of said spindle (40) with respect to said base (10), while transmitting rotation by said motor (33), as one end of the vehicle is lifted and the vehicle pivots about the wheels at its other end.

6. Lifting device as claimed in claim 4, including a guide way (20, 21, 21') surrounding said spindle (40), said guide way being mounted (25, 26, 27, 28) for swinging movement on said base to permit tilting thereof; said load attachment means (55) being slidable in said guide way (21, 21'); said sleeves being movable within said guide way while the outer sleeve (52) is constrained against rotation with respect to said spindle (40) by engagement with said guide way.

7. Lifting device as claimed in claim 1, including a housing (FIGURE 2 (63)) slidable on said spindle (61), said motor (33) and said unilateral rotary motion-longitudinal motion translator (50) being mounted within said housing (63); and said spindle (61) being secured to said base and mounted to be constrained against rotation with respect to said base.

8. Lifting device as claimed in claim 1, wherein said spindle (40) has a region of lesser diameter (56, 56') proximate to its upper and lower ends whereby, when said unilateral rotary motion-longitudinal motion translator (50) reaches the regions of lesser diameter, engagement with said spindle will be lost and no further motion will be transferred, so that over-running of the end positions of the spindle is prevented.

9. Lifting device as claimed in claim 1, wherein said motor (33) is an electric motor.

10. Lifting device as claimed in claim 9, wherein said motor (33) is a 12-volt, reversible D-C motor.

11. Automotive jack for connection to a branch circuit of the electrical system of a motor vehicle, comprising:

a base (10);

a reversible electrical motor (33) of a voltage rating of the electrical system of said vehicle, and of a power rating below the fused rating of said branch circuit, said motor (33) being mounted in said base (10);

an elongated guideway (20);

means (25) secured to said base (10) releasably (26) mounting said guideway (20) on said base (10);

a smooth spindle (40) located within said guideway (20);

rotation transmitting means (34, 35, 36, 38, 39, 41) interconnecting said spindle (40) and said motor (33) to transmit rotation from said motor (33) to said spindle (40);

a unilateral rotary motion-longitudinal motion translator (50) in engagement with said spindle (40);

said translator including means for gripping said spindle upon cessation of said relative rotation of said spindle and translator *and comprising rotatable means rotating about axes inclined with respect to the axis of the spindle and engaging said spindle;* and vehicle lifting means (12, 55) second to said unilateral rotary motion-longitudinal motion translator.

12. Automotive jack as claimed in claim 11, wherein said guideway is mounted on said securing means for limited swinging movement (28) with respect to said base;

said rotation-transmitting means including a universal joint (38) to permit swinging movement of said spindle with respect to said base (10) while being driven by said motor (33) secured to said base (10).

13. Automotive jack as claimed in claim 11, wherein said unilateral rotary motion-longitudinal motion translator includes a cage member (51) carrying a plurality of helical springs (53) having their major axes inclined with respect to the axis of the spindle (40) and an outer sleeve (52) surrounding said cage member (51), said springs engaging the surface of said spindle (40) and the inner surface of said outer sleeve (52);

said vehicle-lifting means including a bracket (55) slidable in said guideway (20) and constrained against rotation relative to said base by said guideway;

said bracket being secured to said outer sleeve (52).

14. Automotive jack as claimed in claim 11, wherein said smooth spindle is formed with regions of lesser diameter (56, 56') proximate its ends.

References Cited

The following references, cited by the Examiner, are of record in the patented file of this patent or the original patent.

UNITED STATES PATENTS

| | | | |
|---|---|---|---|
| 2,152,518 | 3/1939 | Wolff | 74—25 |
| 3,046,800 | 7/1962 | Pravel | 74—25 |
| 3,081,639 | 3/1963 | Hauptman | 214—339 X |
| 2,981,518 | 4/1961 | Wise | 254—101 |

OTHELL M. SIMPSON, Primary Examiner